United States Patent [19]

Bernstein

[11] E Re. 31,017

[45] Reissued Aug. 24, 1982

[54] METHOD FOR FUSING MALE PLUG AT END OF POWER LINE CORD

[75] Inventor: Elliot Bernstein, Rockville Centre, N.Y.

[73] Assignee: Bel Fuse Inc., Jersey City, N.J.

[21] Appl. No.: 135,331

[22] Filed: Mar. 31, 1980

Related U.S. Patent Documents

Reissue of:

[64] Patent No.: 4,176,902
Issued: Dec. 4, 1979
Appl. No.: 846,036
Filed: Oct. 27, 1977

[51] Int. Cl.[3] ..... H01H 85/12; H01R 13/68

[52] U.S. Cl. ..... 339/147 P; 337/198

[58] Field of Search ..... 174/52; 337/197, 198, 337/207, 229, 231, 234, 237, 269; 339/147 P, 147 R, 159 C, 272 R

[56] References Cited

U.S. PATENT DOCUMENTS

| | | | |
|---|---|---|---|
| 1,514,905 | 11/1924 | Hessel | 337/198 |
| 1,886,706 | 11/1932 | MacDonald | 337/269 |
| 2,636,097 | 4/1953 | Shapiro | 337/198 |
| 2,640,125 | 5/1953 | Eggers | 337/201 X |
| 2,668,885 | 2/1954 | Gerlat | 339/159 C X |
| 2,964,726 | 12/1960 | Michals | 339/272 R X |
| 3,291,894 | 12/1966 | Sampson | 174/52 R |
| 3,408,620 | 10/1968 | Damiano | 339/272 R |
| 3,535,667 | 10/1970 | Harnish et al. | 337/197 |
| 4,080,039 | 3/1978 | Ahroni | 337/197 X |

FOREIGN PATENT DOCUMENTS

| | | | |
|---|---|---|---|
| 968626 | 4/1950 | France | 337/198 |

*Primary Examiner*—Eugene F. Desmond
*Attorney, Agent, or Firm*—Ostrolenk, Faber, Gerb & Soffen

[57] ABSTRACT

A fused plug having the line cord wires terminating within the plug and a fuse link inside the plug between each wire and an associated plug prong.

3 Claims, 9 Drawing Figures

FIG. 1.
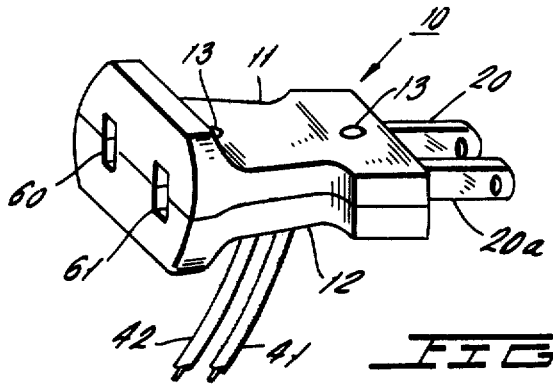
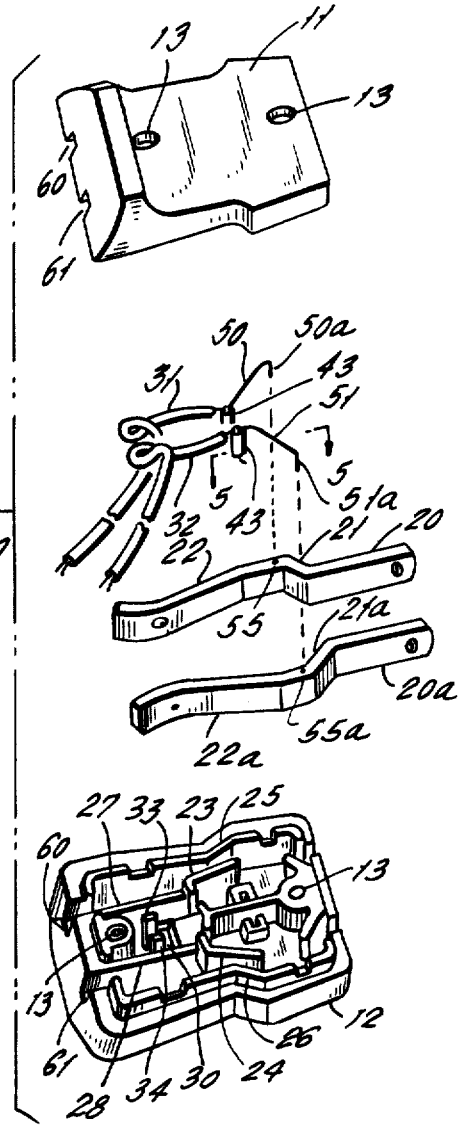
FIG. 2.
FIG. 3.
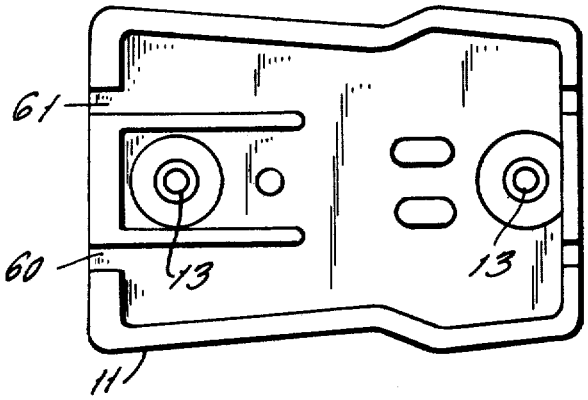
FIG. 4.
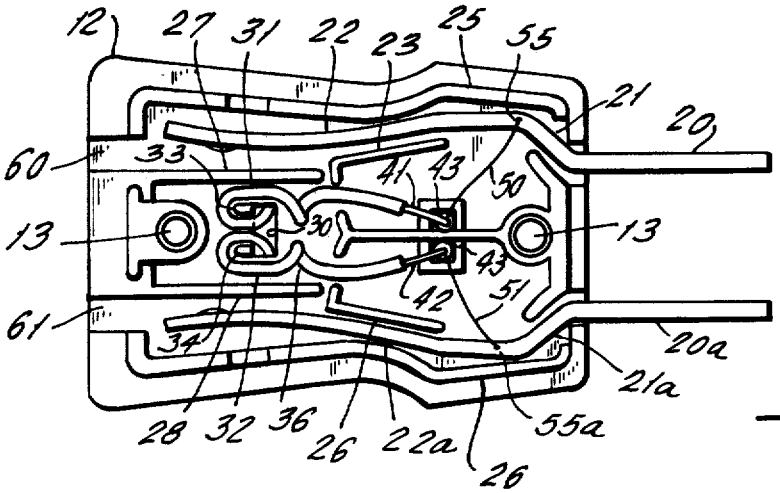
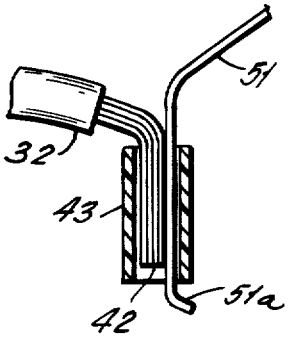
FIG. 5.

FIG. 6
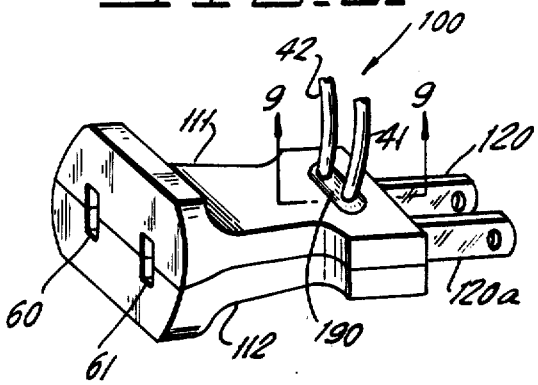
FIG. 7
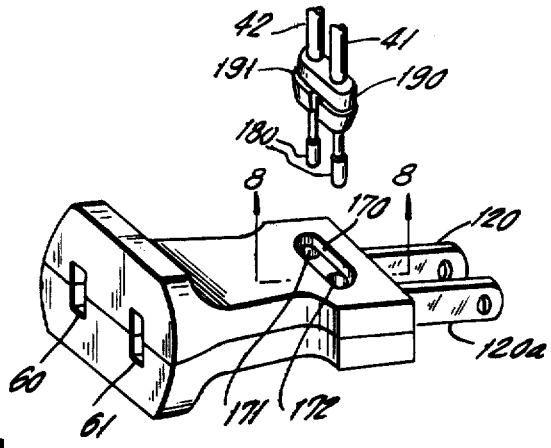
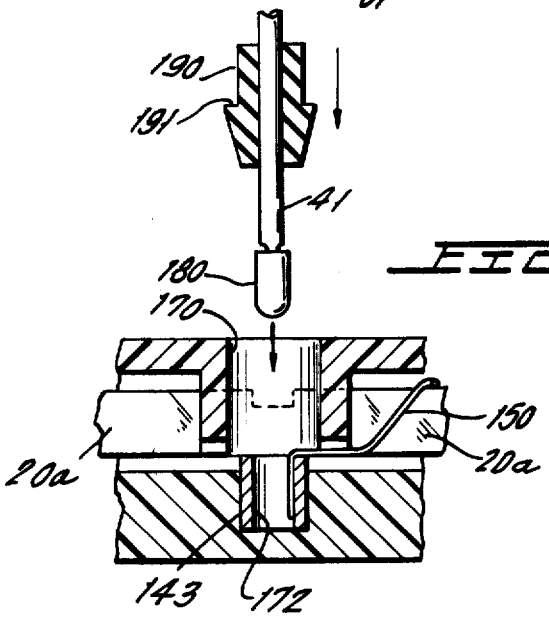
FIG. 8
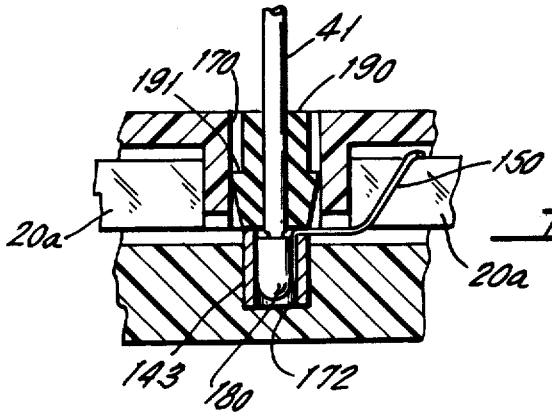
FIG. 9

METHOD FOR FUSING MALE PLUG AT END OF POWER LINE CORD

Matter enclosed in heavy brackets [ ] appears in the original patent but forms no part of this reissue specification; matter printed in italics indicates the additions made by reissue.

DESCRIPTION OF THE INVENTION

The present invention relates to fused plugs and more particularly to a plug at the end of a line cord which is intended to be plugged into a wall socket and which carries a fuse element therein.

In the operation of appliances of various types, including television in the home, it has become more and more desirable to arrange the electrical protection including fuses so that this protection is as close as possible to the source of current thereby protecting the entire appliance including the line cord and especially protecting the user thereof. Thus, a requirement has developed that the line cord be fused or even that the plug of the line cord be fused so that in the event a fault occurs anywhere in the system from the line cord into the appliance the fuse will deactivate the entire appliance and thereby protect the consumer. Since the problem is not merely to fuse the plug and thereby to protect the entire appliance, but to avoid an increase in cost which might be resisted by the consumer, it becomes necessary to devise a means for fusing the plug in such manner that the increase in cost is minimal. The prime monetary consideration is that the fused plug structure be no more costly than a line cord plus a replaceable fuse somewhere in the system.

The present invention contemplates that the plug body be made of insulating material as it necessarily must be and also fire resistant material, that the plug prongs are connected not directly to the line cord, but are connected to fuse links or wires which in turn are connected to the line cord. Hence the fuse links or wires, being in circuit with one or both sides of the pair of leads in the line cord, provide the necessary protection and make it possible to prepare an effective, but simple and inexpensive fused plug at the end of a line cord for use on appliances.

The primary object of the present invention, therefore, is the provision of a simplified fused plug for a line cord wherein the plug prongs are connected directly to fuse links and the fuse links are then connected directly to one or both sides of the line cord.

A further object is the arrangement of the fused plug so that the interior is not accessible for adjustment or mistreatment by the user and that any attempt to do so or any attempt to disassemble the plug will result in a breaking of the fused link.

The foregoing and many other objects of the present invention will become apparent in the following description and drawings in which:

FIG. 1 is a view in perspective of the fused line plug, of the present invention.

FIG. 2 is an expanded view showing the interior construction of the fused line plug.

FIG. 3 is a view of the interior of the cover of the fused line plug.

FIG. 4 is a view of the interior of the base or support members of the fused line plug.

FIG. 5 is a cross-sectional view taken on line 5—5 of FIG. 2 looking in the direction of the arrows and showing the connection between the fused link and the line cord.

FIG. 6 is a view in perspective of a modified form of fuse plug showing a plug in which the wires may be inserted by the user.

FIG. 7 is a view in perspective showing a pair of wires being inserted.

FIG. 8 is a cross-sectional view taken along line 8, 8 of FIG. 7, looking in the direction of the arrows.

FIG. 9 is a cross-sectional view taken on line 9, 9 of FIG. 6 looking in the direction of the arrows.

Figure 10:
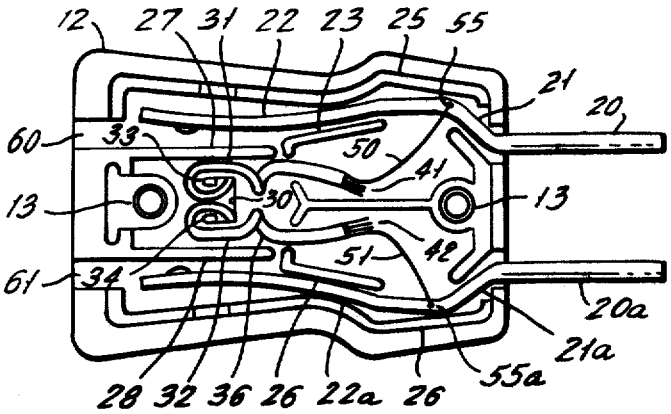

Referring to the Figures, the fused line plug 10 is provided with an upper molded housing element 11 and a lower housing element 12. This does not necessarily require the particular orientation thus noted in actual use. Each of the housings 11 and 12 is a molded piece made of insulating and fire-resistant material and may be secured together preferably by rivets through the corresponding openings 13, 13. The lower housing 12 is provided with a plurality of elements which will serve to guide the structures hereinafter described. These various elements will be explained further as the structures with which they cooperate are described.

The lower housing carries the prongs 20, 20a which are provided with the re-entrant bends 21 and 21a and the extensions 22 and 22a. Guide members 23 and 24 in the lower housing 12 cooperate with the wall elements 25 and 26 of the lower housing to position the prongs 20, 20a and the units which are connected thereto. Additional walls 27 and 28 in the housing serve as an additional barrier between the extensions 22, 22a of the prongs 20, 20a and as a guide for insertion of an alternate plug as hereinafter described.

The lower housing 12 is also provided with the openings 30 through which the line cord sections 31 and 32 are led. The line cords are wrapped around the posts 33 and 34 for tension relief and may be knotted inside at the area 36 if desired although this is not necessary. The bared ends 41, 42 of the line cords 31,32 are received in the positioning sleeves 43 carried by the lower housing 12. The fuse links 50 and 51 are inserted in the sleeves 43, as seen in FIG. 5 and are connected by pressure fit to the respective line cords.

While separate fuse links 50 and 51 are shown, it is also possible, when stranded wire is used for the line cord, to extend one or more of the strands to connect at 55,55a to the prongs, thereby forming integral fuse links. It is also possible when conditions require or permit and further reduction in cost is necessary, to connect a fuse link directly from the bared wire of the line cord to the prong without the use of the sleeve.

The opposite ends of the fuse links 50 are connected to the respective prongs 20, 20a in any suitable manner, as by staking, swaging or in any other manner which will result in effective conduction of current, as indicated by the insertion of end 51a of link 51 and end 50a of link 50 into the openings 55a and 55 of the respective prongs 20a and 20. The unit is then completed by riveting the cover member 11 thereon.

It will be seen that the line cord consisting of the elements 41,42 are drawn out through the bottom opening 30 in the bottom member 12. The elements of the line cord, after being appropriately supported for tension by the posts 33 and 34, and knotted for tension relief if desired, are connected through the sleeves 43 to the fuse links which are in turn connected to the prongs.

It will be seen that in the event an over-current condition occurs which is beyond the rating of the fuse links 50, 51 then one or both fuse links will be destroyed and current will be interrupted within the plug and therefore to the appliance to which it is connected by a line cord.

In addition to the protective structure here provided, a bypass plug arrangement may also be provided by reason of the utilization of the extensions 22 and 22a of the prongs 20 and 20a. These extensions, as will be seen, extend up to the openings 60,61 in the rear of the plug opposite the prongs. Therefore, the plug of another appliance may be inserted into the plug of the present invention in order to provide an additional circuit for an alternate device which, however, will not be protected by the fuse construction of the present invention.

In some instances it is desirable to manufacture the plug completely without the wires 41, 42 secured therein in the manufacturing process. This will enable the user to connect wires to the plug. The connection to the line cord should, however, be such as to preserve to ability of one fuse for the line cord.

In the modified form as shown in FIGS. 6 to 9 in which the fuse plug 100 has the upper section 111 and the lower section 112. The upper section 111 is provided with a recess 170 of a generally rectangular shape communicating with two openings 171 and 172 therein, which openings lead to respective sleeves 143, 143. Each of the sleeves 143 is connected to the respective fuse links 150, 151 which are connected to the prongs 120, 120a in a manner already previously described. However, each of the sleeves 143 is so arranged that it will receive and make contact with a contact tip 180, 180 on the line cord 41–42. The line cord 41–42 has a retainer 190 slipped thereon. The retainer 190 is preferably of compressible insulating material initially slightly larger in section than the recess 170 but so arranged as seen in FIGS. 6 and 9 that when it is pushed into the recess 170 it will be compressed and be a force fit therein. For this reason, the outer surface of plug member 190 may be given an irregular shape as for instance by being provided with a rib 191 which will serve to anchor the plug 190 in the recess 170.

A portion of each of the wires 41, 42 projecting from the bottom end of the plug 190 is stripped and a contact tip 180 is mounted thereon to make good contact with the wires inside the insulation. When the wires are pushed into the openings 171, 172 and the contact tips on 180 inserted into the respective sleeves 143, appropriate contact is made with the sleeve 143 and through the fuse links, 150, with the prongs 120. Thereafter the plug 190 is pushed down from the position shown in FIGS. 7 and 8 to the position shown in FIGS. 6 and 9, to anchor the wire tips 180 in the sleeves 143.

Therefore, the line cord need not necessarily be manufactured in conjunction with the fused plug; but the fused plug may be manufactured independently with the means for receiving the tips of the line cord. All of the other elements of the plug may remain the same including for instance the piggy-back openings 60, 61 so that additional plugs may be inserted at the rear of the plug.

In the foregoing the present invention has been described solely in connection with a preferred illustrated embodiment thereof. Since many variations and modifications of the present invention will now be obvious to those skilled in the art, it is preferred that the scope of this invention be determined not by the specific disclosures herein contained but only by the appended claims.

I claim:

[1. A fused plug comprising a housing;
a pair of prongs mounted in said housing and having substantially parallel extensions outside said housing;
an opening in said housing;
a line cord extending through said opening into said housing;
said line cord comprising a pair of wires;
a fuse link between the end of at least one wire and a prong adjacent said wire;
wherein a pair of sleeves is positioned in the said housing;
an end of one of said wires and an end of one of said fuse links being inserted in each sleeve and connected by pressure fit therein.]

[2. The fused plug of claim 1 wherein the other end of each fuse link is secured to a prong.]

[3. The fuse plug of claim 2 wherein said line cord comprises a pair of wires and said opening comprises a separate opening for the end of each wire; each sleeve being located directly adjacent one of said separate openings for receiving a respective wire and a respective other end of said fuse links.]

4. [The fused plug of claim 1 wherein the wires of said line cord are stranded wires and wherein the fuse link comprises at least one selected strand of said wire]
*A fused plug comprising a housing;*
*a pair of prongs mounted in said housing and having substantially parallel extensions outside said housing;*
*an opening in said housing;*
*a line cord extending through said opening into said housing;*
*said line cord comprising a pair of wires, said wires being stranded wires and each said wire being in electrical contact with a respective one of said prongs; and*
*a fuse link between the end of at least one of said wires and one of said prongs adjacent said wire, said fuse link comprising at least one selected strand of said wire.*

[5. A fused plug comprising a housing;
a pair of prongs mounted in said housing and having substantially parallel extensions outside said housing;
an opening in said housing;
a line cord extending through said opening into said housing;
said line cord comprising a pair of wires;
a fuse link between the end of at least one wire and a prong adjacent said wire;
wherein a pair of sleeves is positioned in the said housing;
an end of one of said wires and an end of one of said fuse links being inserted in each sleeve and connected by pressure fit therein;
wherein an opening is provided in each prong and the other end of each fuse link is secured in said opening.]

6. A fused plug comprising a housing;
a pair of prongs mounted in said housing and having substantially parallel extensions outside said housing;
an opening in said housing;
a line cord extending through said opening into said housing;
said line cord comprising a pair of wires;

*each said wire having one end in electrical contact with a respective one of said prongs;* a fuse link [between] *connecting* the end of [at least] one *said* wire and [a] *its respective said* prong, *its respective said prong being* adjacent said wire;

*said fuse link being the means by which said one wire is maintained in electrical contact with its respective said prong;* wherein a [pair of sleeves ] *sleeve* is positioned in [the] said housing;

an end of [one of] said [wires] *wire* and an end of [one of] said *one* fuse [links] *link* being inserted in [each] *said* sleeve and connected by pressure fit therein;

*the inner dimension of said sleeve and the outer dimensions of said fuse link end and said end of said wire being related to each other to effect a pressure fit electrical connection through said sleeve;* wherein the other end of [each] *said* fuse link is secured to [a] *its respective said* prong;

wherein [said line cord comprises a pair of wires and] said opening comprises a separate opening for the end of each *said* wire; [each] *said* sleeve being located directly adjacent *that* one of said separate openings *through which said one wire passes*;

wherein a surface of said plug has a recess;

said separate openings being located in said recess; and a plug for said recess; passages through said plug slidably receiving said wires;

said plug being insertable in said recess when said [wires end] *wire end* are inserted in said [contact] sleeve.

7. The fused plug of claim 6, *further comprising a second sleeve positioned in said housing directly adjacent the other one of said separate openings, and a second fuse link having one end secured to the other of said prongs and having another end secured to the end of the other of said wires, said second fuse link being the means by which said other wire is maintained in said electrical contact with said other prong; and* in which a contact tip is carried by the end of each wire; each tip fitting closely in its respective sleeve for current conduction with its respective wire.

* * * * *